(12) United States Patent
Hirai et al.

(10) Patent No.: US 7,817,043 B2
(45) Date of Patent: Oct. 19, 2010

(54) RADIO FREQUENCY TAG

(75) Inventors: Tadahiko Hirai, Ohta-ku (JP);
Takayuki Sumida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 11/283,962

(22) Filed: Nov. 22, 2005

(65) Prior Publication Data

US 2006/0125637 A1 Jun. 15, 2006

(30) Foreign Application Priority Data

Nov. 30, 2004 (JP) ............... 2004-345837

(51) Int. Cl.
*G08B 13/14* (2006.01)
(52) U.S. Cl. .............. 340/572.5; 340/572.7; 340/572.1; 343/742; 343/873; 343/895
(58) Field of Classification Search ................. 235/492; 343/742, 895, 873; 340/572.5, 572.7, 572.1
See application file for complete search history.

(56) References Cited

U.S. PATENT DOCUMENTS

| | | | | |
|---|---|---|---|---|
| 5,103,210 A | * | 4/1992 | Rode et al. ............... | 340/572.3 |
| 5,111,186 A | * | 5/1992 | Narlow et al. ............ | 340/572.5 |
| 5,119,070 A | * | 6/1992 | Matsumoto et al. ...... | 340/572.5 |
| 5,122,923 A | | 6/1992 | Matsubara et al. ......... | 361/321 |
| 5,318,920 A | * | 6/1994 | Hayashide .................. | 438/398 |
| 5,574,431 A | | 11/1996 | McKeown et al. .......... | 340/572 |
| 6,031,458 A | * | 2/2000 | Jacobsen et al. ......... | 340/572.5 |
| 6,400,271 B1 | * | 6/2002 | Davies et al. ............ | 340/572.1 |
| 6,621,410 B1 | * | 9/2003 | Lastinger et al. ......... | 340/10.42 |
| 6,708,891 B2 | * | 3/2004 | Amtmann et al. ........... | 235/492 |
| 7,152,804 B1 | * | 12/2006 | MacKenzie et al. ......... | 235/492 |
| 2006/0108416 A1 | | 5/2006 | Hirai .......................... | 235/382 |
| 2006/1010926 | | 5/2006 | Hiari et al. .................. | 345/204 |

FOREIGN PATENT DOCUMENTS

| | | |
|---|---|---|
| JP | 3-87055 | 4/1991 |
| JP | 5-501468 | 3/1993 |
| JP | 7-500436 | 1/1995 |
| JP | 7-074047 | 3/1995 |
| JP | 9-171597 | 6/1997 |
| JP | 11-306311 | 11/1999 |
| JP | 2000-235635 | 8/2000 |
| JP | 2002-104626 | 4/2002 |
| JP | 2002-163622 | 6/2002 |

(Continued)

*Primary Examiner*—George A Bugg
*Assistant Examiner*—Hongmin Fan
(74) *Attorney, Agent, or Firm*—Fitzpatrick, Cella, Harper & Scinto

(57) ABSTRACT

The present invention provides an RF tag which does not have an integrated circuit such as a silicon chip, can retain a plurality of information, can rewrite or add the information, and is inexpensive. The RF tag includes an RF resonance circuit which has at least two capacitors connected in series or parallel and at least one coil antenna formed on a substrate, wherein at least one of the capacitors is an anti-fuse which irreversibly short-circuits when a voltage higher than a threshold voltage is applied to the anti-fuse, and the surface of an electrode constituting the capacitor has a mean roughness of 1 μm or less.

3 Claims, 8 Drawing Sheets

FOREIGN PATENT DOCUMENTS

| | | | |
|---|---|---|---|
| JP | 2002163622 | * | 6/2002 |
| JP | 2002-245429 | | 8/2002 |
| JP | 2002245429 | * | 8/2002 |
| JP | 2002-319004 | | 10/2002 |
| JP | 2004-205451 | | 7/2004 |
| WO | 92/00578 | | 1/1992 |
| WO | 93/08548 | | 4/1993 |

* cited by examiner

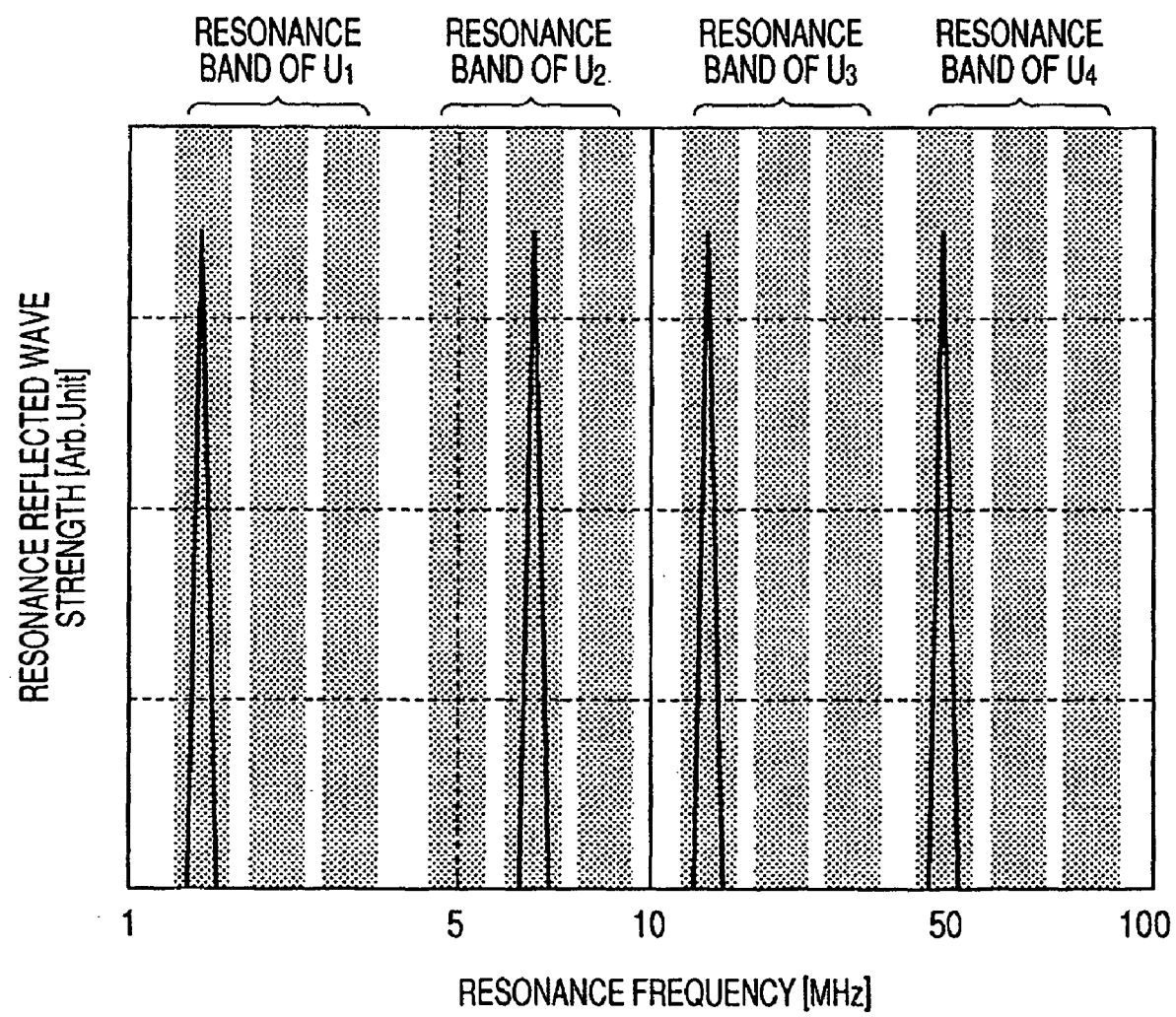

RADIO FREQUENCY TAG

BACKGROUND OF THE INVENTION

1. Field of the Invention

The present invention relates to a radio frequency (RF) tag, and particularly relates to an anti-fuse type RF tag using an anti-fuse in a resonance circuit.

2. Related Background Art

Conventionally, an integrated circuit using a silicon-based material has been used in all fields such as a computer, communication and a household electric appliance.

On the other hand, non-contact RF tags and cards using a semiconductor integrated circuit have been widely used in recent years. These tags and cards are equipped with a microprocessor, cryptographic logic and a nonvolatile memory and are suitable for high function, but are expensive for use in such an inexpensive RF tag as to rewrite a few bits, and does not wedge into the market.

In addition, a burglar-proof tag capable of irreversibly recording the only binary signals has been partly in the actual use.

Japanese Patent Application Laid-Open Nos. 2002-245429 and 2002-319004 describe a resonance tag having an LC resonance circuit capable of storing a plurality of bits and writing additional data.

However, although the resonance tag disclosed by Japanese Patent Application Laid-Open No. 2002-245429 and Japanese Patent Application Laid-Open No. 2002-319004 has a function of writing additional data, a capacitor and an anti-fuse are formed through a through hole, so that it has been difficult to secure the thickness uniformity and flatness of an insulating film and to stably-manufacture the resonance tag. The resonance tag also had a problem of having low manufacture efficiency because it needs to prepare the through hole.

The present invention provides an RF tag which is manufactured in a lower cost than a silicon based-integrated circuit, has a memory capacity of a few bits or more and can be stably manufactured, to the field of a non-contact RF tag and card.

SUMMARY OF THE INVENTION

The present invention provides an RF tag including an RF resonance circuit which has at least two capacitors connected in series or parallel and at least one coil antenna formed on a substrate made of a material including at least one selected form the group consisting of a resin, glass, paper and a metal, and which is resonated by electromagnetic induction, wherein the at least two capacitors and at least one coil antenna are all arranged on one side of the substrate.

In the above RF tag, it is preferable that two or more sets of the RF resonance circuits are arranged on the same and one substrate, and each of the sets has a different resonance frequency.

The present invention provides an RF tag including an RF resonance circuit which has at least one capacitor and at least one coil antenna formed on a substrate made of a material including at least one selected from the group consisting of a resin, glass, paper and a metal, and which is resonated by electromagnetic induction, wherein two or more sets of the RF resonance circuits are arranged on the same and one substrate, each of the sets has a different resonance frequency, and the capacitors and coil antennas of the two or more sets of the RF resonance circuits are all arranged on one side of the substrate.

In an RF tag according to the present invention, at least one of the capacitors is preferably an anti-fuse which irreversibly short-circuits when a voltage greater than a threshold value is applied to the anti-fuse. The above RF tag according to the present invention is an anti-fuse type RF tag. In the anti-fuse type RF tag, it is preferable that additional data are written by utilizing a phenomenon that a resonance frequency varies when at least one of the anti-fuses irreversibly short-circuits.

In the RF tag according to the present invention, it is also preferable that the surface of an electrode constituting the capacitor has a mean roughness of 1 μm or less.

In an RF tag according to the present invention, the capacitors may be connected in series and have different capacitances, or the capacitors may be connected in parallel and have different threshold voltages.

In addition, at least one of the capacitors may have an insulating film including at least one selected from the group consisting of aluminum oxide, silicon oxide, tantalum oxide, silicon nitride and titanium oxide, or at least one of the capacitors may have the insulating film including an organic substance.

BRIEF DESCRIPTION OF THE DRAWINGS

FIG. 6 is a graph showing characteristics of reading information of an RF tag in Embodiment 1 of the present invention;

DESCRIPTION OF THE PREFERRED EMBODIMENTS

Figure 1:
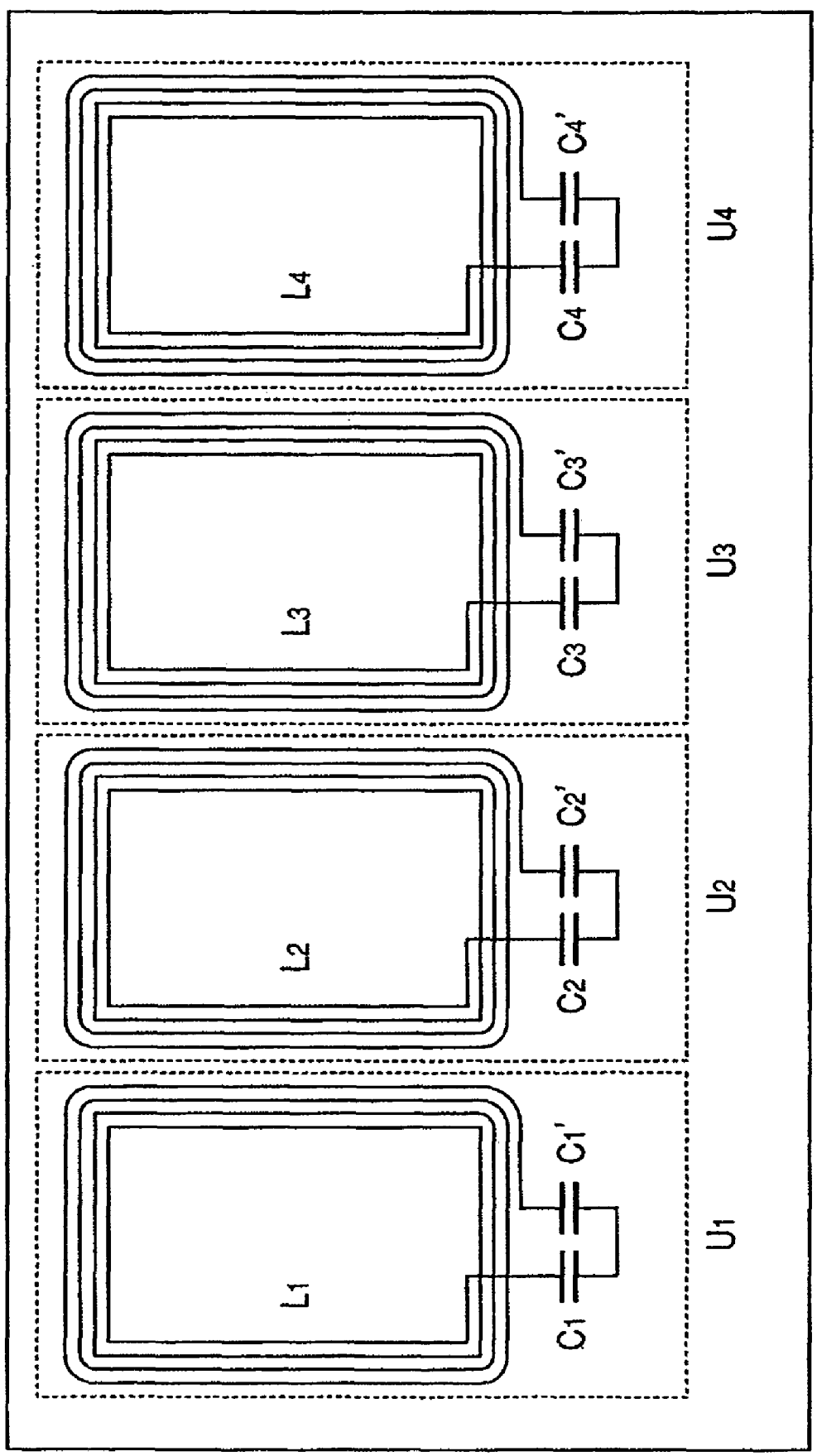
FIG. 1 is a schematic view for showing one embodiment of an RF tag according to the present invention.

An RF tag according to the present invention has two or more capacitors and at least one coil antenna arranged on one side of the substrate, and accordingly can make it easy to control the capacitance of the capacitor in comparison with an RF tag using a substrate as a dielectric layer of the capacitor.

An RF tag according to the present invention also has the above-described capacitor and the above-described coil antenna arranged on one side of the above-described substrate, and accordingly can be stably manufactured with a simple method such as a printing method.

In an RF tag according to a preferred embodiment of the present invention, the mean roughness of the electrode surface of a capacitor which constitutes an RF resonance circuit formed on a substrate such as an inexpensive resin or paper is preferably set to 1 μm or smaller, and thereby this makes it possible to secure the thickness uniformity and flatness of an insulating film, and can provide stable performance and high manufacturing efficiency. As a result, the present invention can provide an inexpensive RF tag having a plurality of information which can be rewritten (added) without an integrated circuit such as a silicon chip.

When the RF tag has the above-described capacitors connected in series and having different capacitances from each other, because a larger voltage is distributed to the capacitor having a smaller capacitance, if the capacitor is formed as an anti-fuse, the capacitor having the smaller capacitance as the anti-fuse can be selectively short-circuited to vary a resonance frequency.

When the RF tag also has the above-described capacitors connected in parallel and having different threshold voltages from each other, because the capacitor having the lower threshold voltage as the anti-fuse, if it is formed as an anti-fuse, the anti-fuse is selectively short-circuited to vary a resonance frequency.

In addition, when the RF tag has two or more sets of the above-described RF resonance circuits arranged on the same and one substrate and each of the sets has a different resonance frequency, it can store and additionally write more bits of information therein.

When additional data of the RF tag is written by utilizing a phenomenon that resonance frequency varies by short-circuiting at least one of the anti-fuses irreversibly, the RF tag can stably store and detect the information.

An anti-fuse type RF tag according to the present invention includes an RF resonance circuit which has at least two capacitors connected in series or parallel and at least one coil antenna formed on a substrate made of a resin, paper or the like, and which is resonated by electromagnetic induction, and a detector can detect the existence of the RF tag by radiating it with an electromagnetic wave having a particular frequency, resonating the resonance coil with the electromagnetic wave, and radiating an electromagnetic wave from the resonance coil, and detecting the electromagnetic wave radiated from the resonance coil. Further, when at least one of the above-described capacitors of the RF tag is formed as an anti-fuse which irreversibly short-circuits by applying a voltage higher than a threshold voltage thereto, the above-described anti-fuse causes a short circuit by applying the higher voltage than threshold voltage is applied thereto, whereby the capacitor functions as a fixed resistance with a low ohmic value. The above-described capacitor functions as the capacitor when voltage lower the threshold voltage is applied to the capacitor. By this action, a resonance frequency in the resonance circuit varies. One value is written in the RF tag through the change of the resonance frequency.

The above-described capacitor has a structure of interposing a thin film of an insulator between two electroconductive electrodes, so that the capacitance and breakdown voltage of the above-described capacitor greatly depends on the surface roughness of the electrodes and the thickness uniformity of the film of the insulator. When the employed electrode of the above-described capacitor has the surface roughness of 1 μm or less, the above-described capacitance and the breakdown voltage (threshold voltage for the anti-fuse) become stable. The above-described surface roughness is further preferably 100 nm or smaller.

As an example, a relationship between the surface roughness of a copper electrode on a plastic substrate and the characteristics of an insulating film will be now described.

Figure 9:
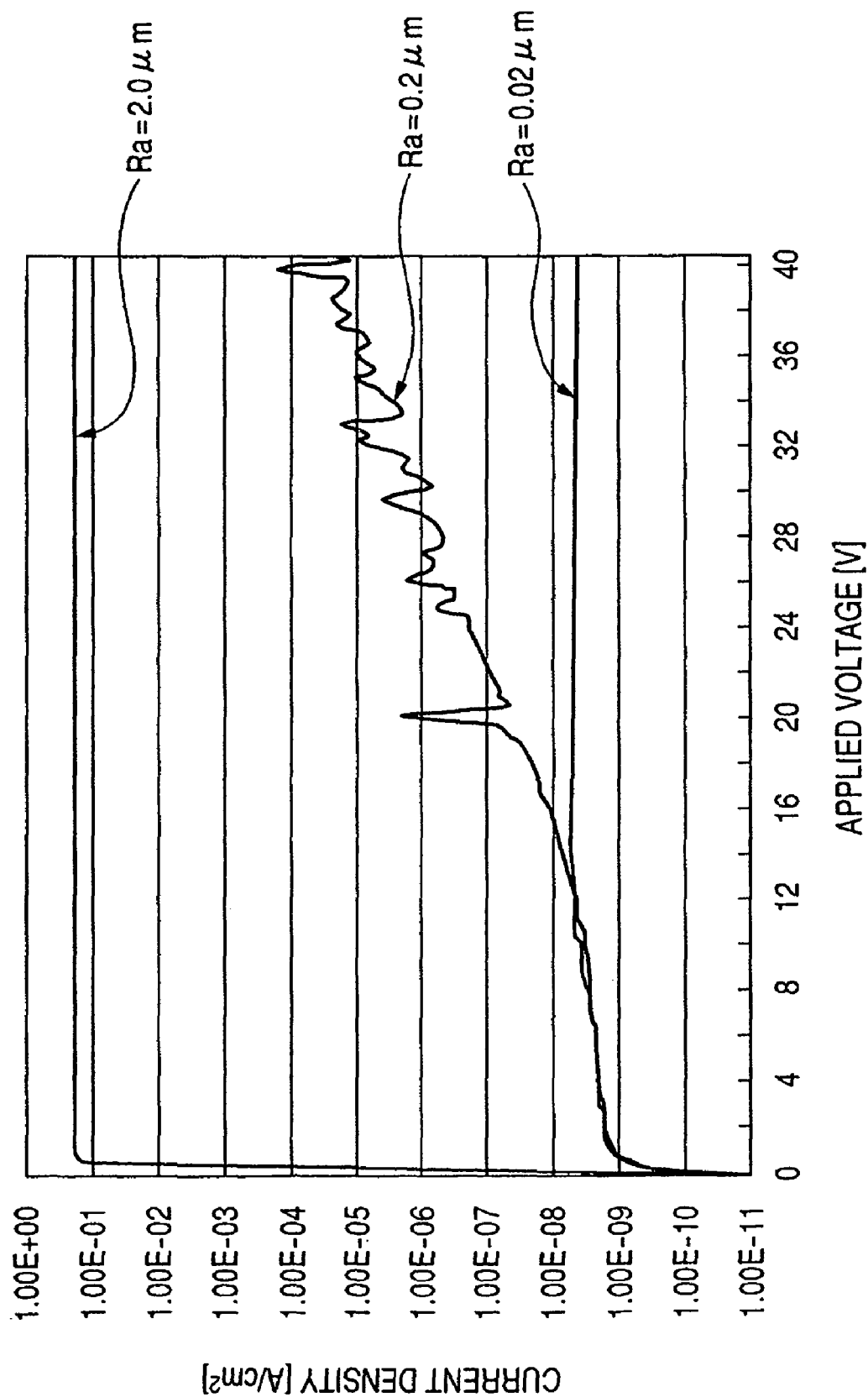
FIG. 9 is a graph showing a relationship between a surface roughness of an electrode and characteristics of an insulating film.

As surface roughness, an arithmetic mean roughness (Ra) was determined by measurement using an optical interference type surface roughness meter. A film of alumina was formed into a thickness of about 0.3 μm on this electrode and then an upper electrode was formed thereon, and the density of a current flowing between the electrodes induced by an applied voltage was measured. The result is shown in FIG. 9 which means that when the Ra exceeds 1 μm, the film of alumina does not show an insulating property. Furthermore, the figure shows that when the Ra is 100 nm (0.1 μm) or less, the film of alumina shows a more adequate insulating property.

One embodiment according to the present invention will be described below with reference to drawings.

Figure 2:
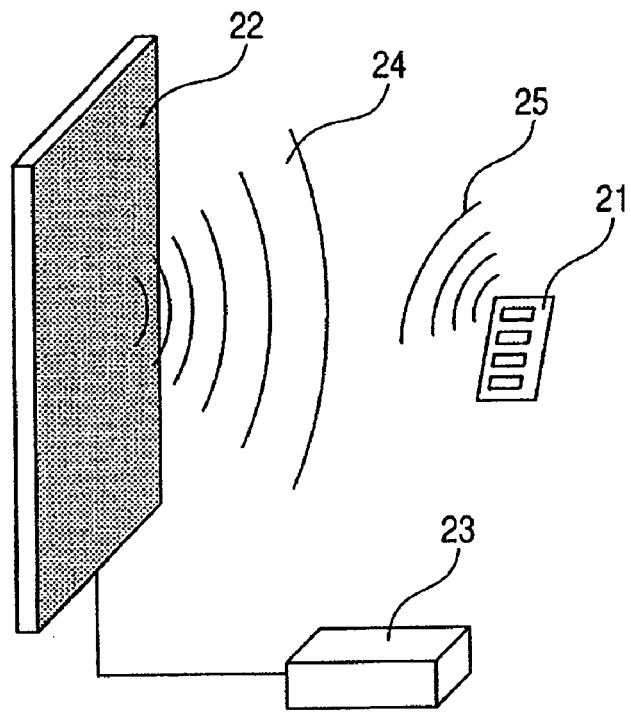
FIG. 2 is a view showing a used condition of an RF tag according to the present invention.
Figure 3:
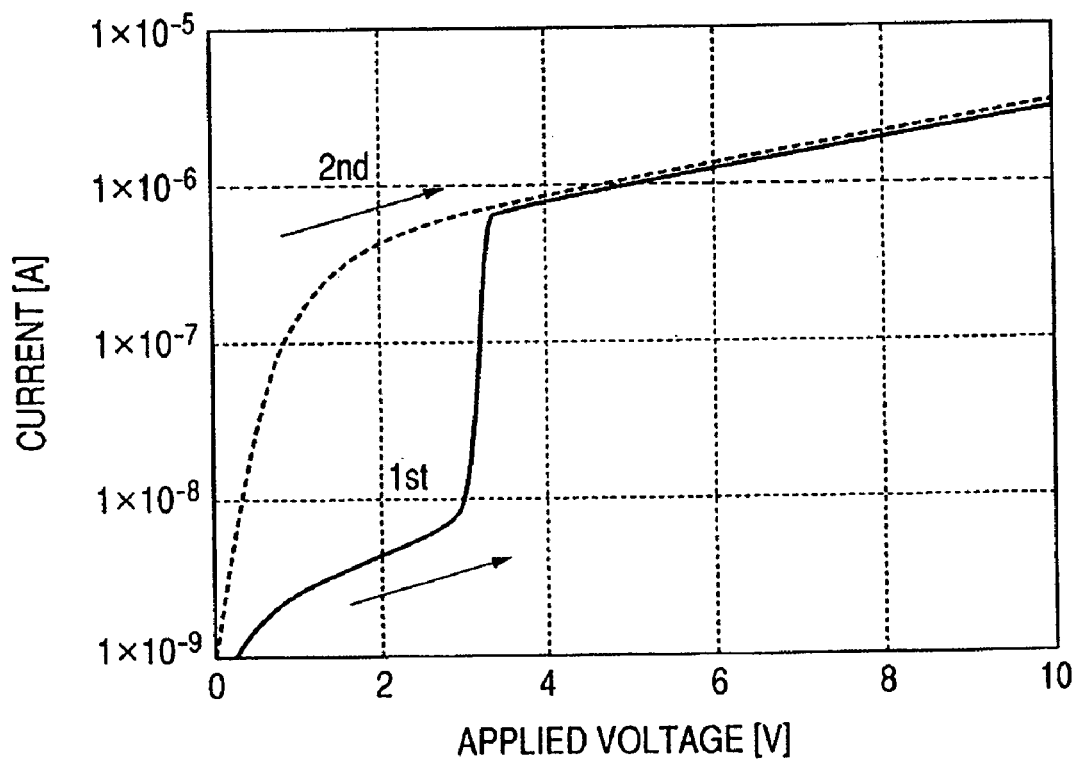
FIG. 3 is a graph showing electrical characteristics of an anti-fuse according to the present invention.

A circuit and an operating method according to the present embodiment shown in FIGS. 1 to 3 will be now described.

FIG. 1 shows one example of an RF resonance circuit in the present invention. One RF resonance circuit U includes a coil antenna L and anti-fuses C and C'. The anti-fuse functions as a capacitor and has a specific capacitance while it is not broken-down (short-circuited). Once the capacitor is broken down, it behaves as a conductor with a low resistance. In FIG. 1, four different resonance circuits $U_1$ to $U_4$ having different resonance frequencies from one another are formed on the same and one substrate.

One RF resonance circuit has two anti-fuses connected in series, and when it resonates with RF, a larger voltage is applied to the anti-fuse having a smaller capacitance, and when the anti-fuse is broken down, the anti-fuse having the smaller capacitance is selectively broken-down, and thus the RF resonance circuit changes a resonance frequency. When one RF resonance circuit includes two anti-fuses as is described in the present Embodiment, the resonance circuit can select three values for the case when two anti-fuses function as capacitors, the case when one anti-fuse is broken-down, and the case when two anti-fuses are broken-down, and an RF tag including four RF resonance circuits can select (3×3×3×3=) 81 values.

FIG. 2 is a schematic view showing a state in which an RF transmission and reception antenna and a resonance frequency detection system detect a resonance frequency of an RF resonance tag as shown in FIG. 1, and reads or writes information from or onto the RF resonance tag. This detection system is composed of the RF tag 21, the antenna 22 for reading and a reading device 23. The antenna 22 for reading radiates an electromagnetic wave 24 for reading, the RF tag resonates with the electromagnetic wave, and the RF tag radiates a reflected wave 25. The antenna 22 for reading receives the reflected wave, and the reading device 23 analyzes the reflected wave and obtains the information stored in the RF tag 21.

FIG. 3 shows the characteristics of a direct current flowing into only an anti-fuse tself. It is understood from the figure that a current value flowing through the anti-fuse suddenly increases at about 3 V due to the first voltage scan, and the anti-fuse has changed into a low impedance (low resistance) state from a high impedance (high resistance) state. It is understood that the low impedance state is kept in the second voltage scan.

When the RF resonance circuit employs such an anti-fuse, the resonance circuit can break down the anti-fuse by setting an RF peak value of a resonance frequency to a sufficiently large value, and can change its own resonance frequency. The RF tag which write (add) information therein by utilizing a phenomenon that resonance frequency varies when the anti-fuse irreversibly short-circuits stably stores and detects information.

By the way, when the RF tag has two or more sets of the RF resonance circuits arranged on the same and one substrate, and even when it has one capacitor in one RF resonance circuit, two or more capacitors and at least one coil antenna are arranged on one side of the substrate. In this case as well, the RF tag shows an advantage effect of the present invention of facilitating the control of a capacitance in a capacitor, as a matter of course.

The present invention will be described below with reference to specific embodiments, but the present invention is not limited by these embodiments at all.

Embodiment 1

Figure 4A:
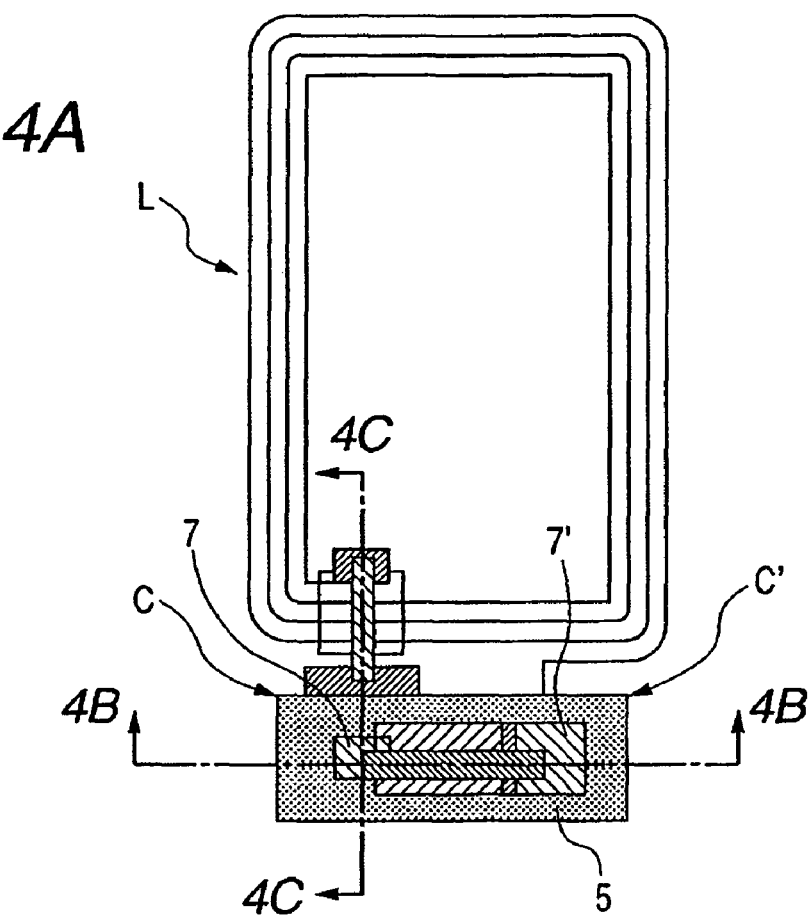
FIGS. 4A, 4B and 4C are views showing a structure of a resonance circuit in an RF tag in Embodiment 1 of the present invention.
Figure 4B:
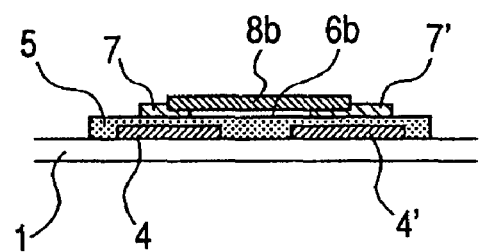
Figure 4C:
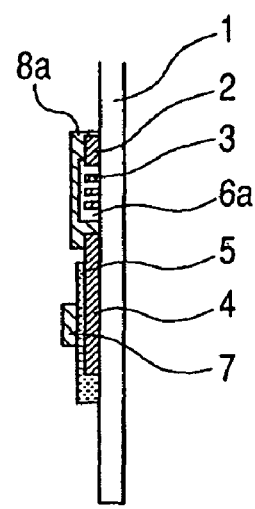
Figure 5:
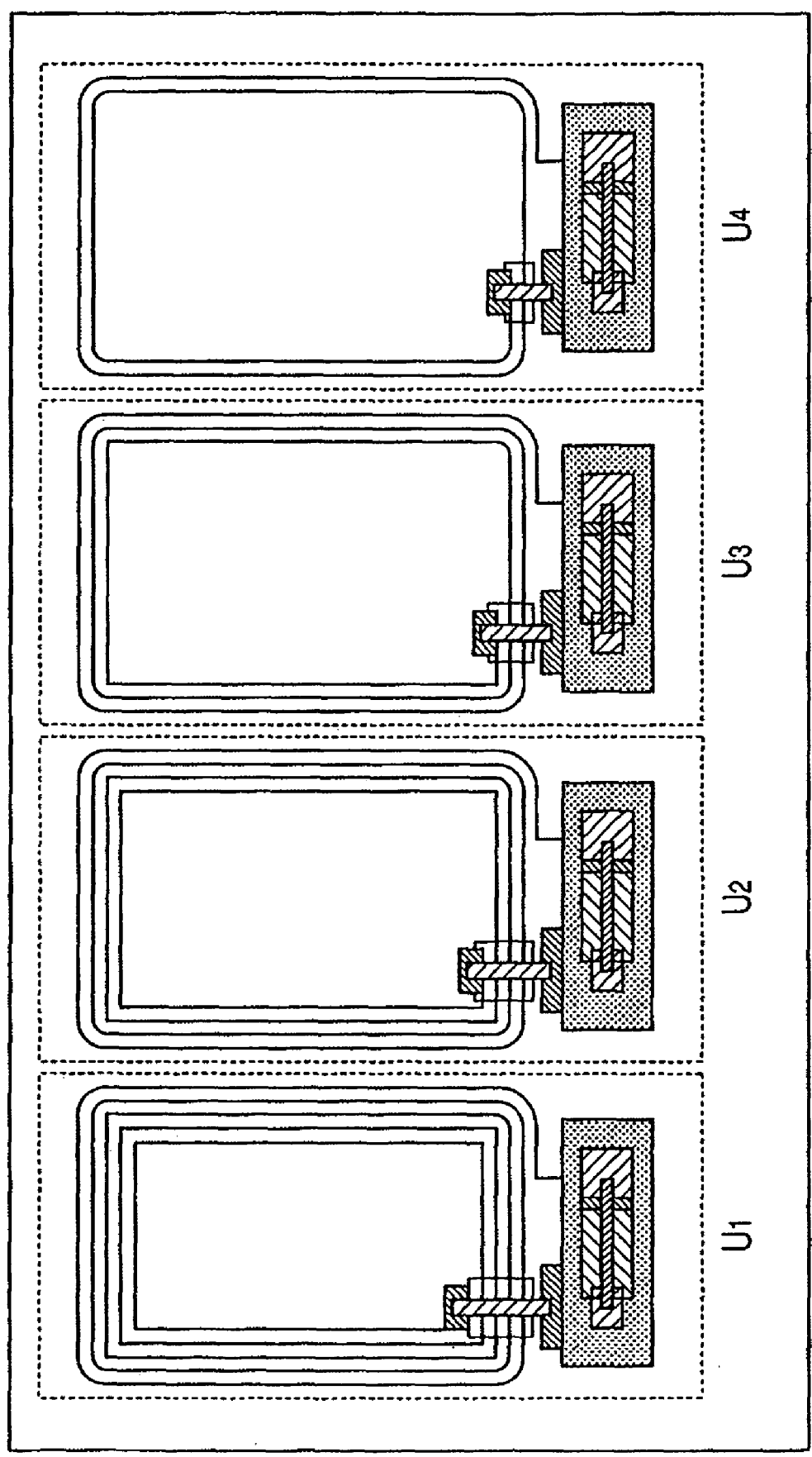
FIG. 5 is a view showing a structure of an RF tag in Embodiment of the present invention 1.

An RF tag having four RF resonance circuits $U_1$ to $U_4$ having different resonance frequencies from one another as is shown in FIG. 5 was prepared by forming four sets of the RF resonance circuits each having an antenna coil L and two anti-fuses C and C' having different capacitances from each other in series on the same and one substrate, as is shown in FIGS. 4A to 4C. In the above step, the four RF resonance circuits $U_1$ to $U_4$ were formed so as to have different resonance frequencies from one another, by forming the antenna coil with different turning numbers from one another.

Each RF resonance circuit was prepared by the steps of: at first forming a coil antenna 3, a contact pad 2 and bottom electrodes 4 and 4' of an anti-fuse on a substrate 1 made of a polyimide resin, by processing a copper foil; further forming an alumina film 5 thereon into a thickness of 10 nm as an insulating film of the anti-fuse by a sputtering technique; then forming element-separating films 6a and 6b made of an epoxy resin thereon by a screen printing method; furthermore, forming upper electrodes 7 and 7' of the anti-fuse and connecting wires 8a and 8b with an electroconductive paste by the screen printing method. Thus, the RF resonance circuit was completed.

FIG. 6 shows one example of the result in which a detector detected the RF resonance frequency reflected from an RF tag prepared in the present embodiment. The figure shows the state that reflected peaks from four RF resonance circuits $U_1$ to $U_4$ are separated. The figure also shows that the RF resonance circuit $U_2$ has the peak of a reflected electromagnetic wave in one step deviated position because an anti-fuse having had a small capacity was broken down.

In order to carry out the breakdown of a specified anti-fuse, an RF transmission and reception antenna radiates a strong RF wave (with a large amplitude) having the same resonance frequency.

Embodiment 2

Figure 7A:
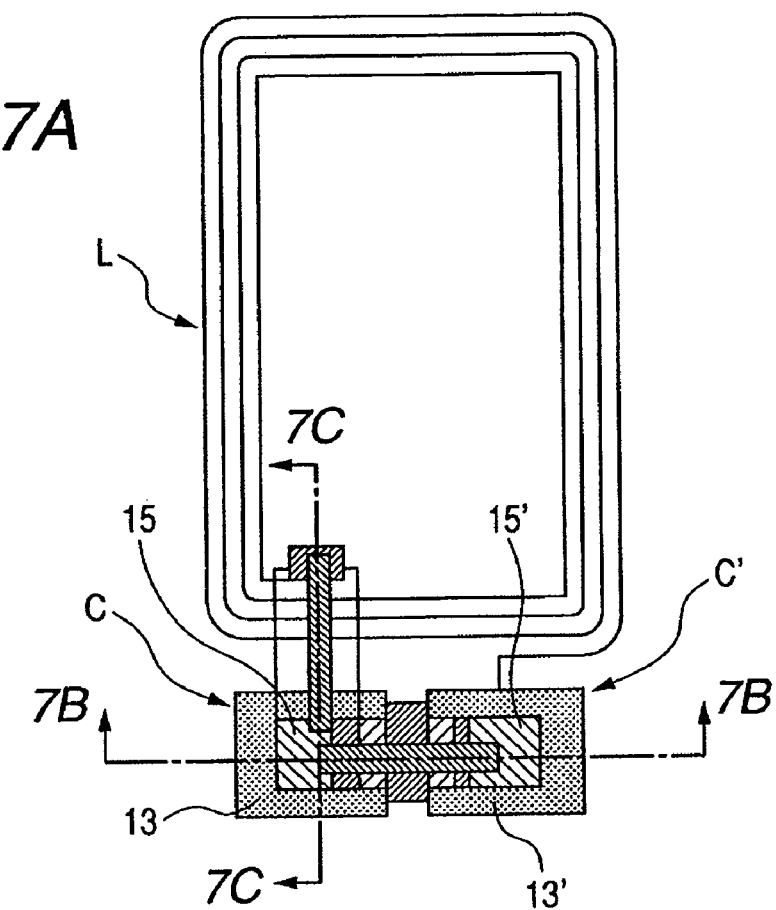
FIGS. 7A, 7B and 7C are views showing a structure of a resonance circuit in an RF tag in Embodiment 2 of the present invention.
Figure 7B:
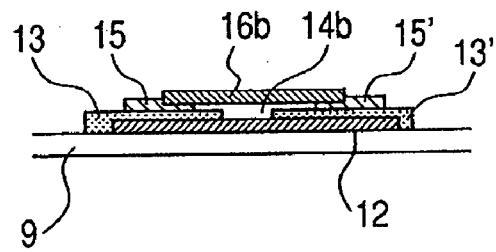
Figure 7C:
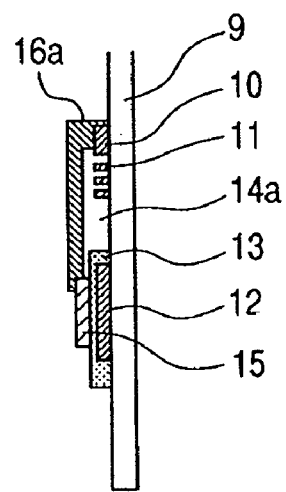
Figure 8:
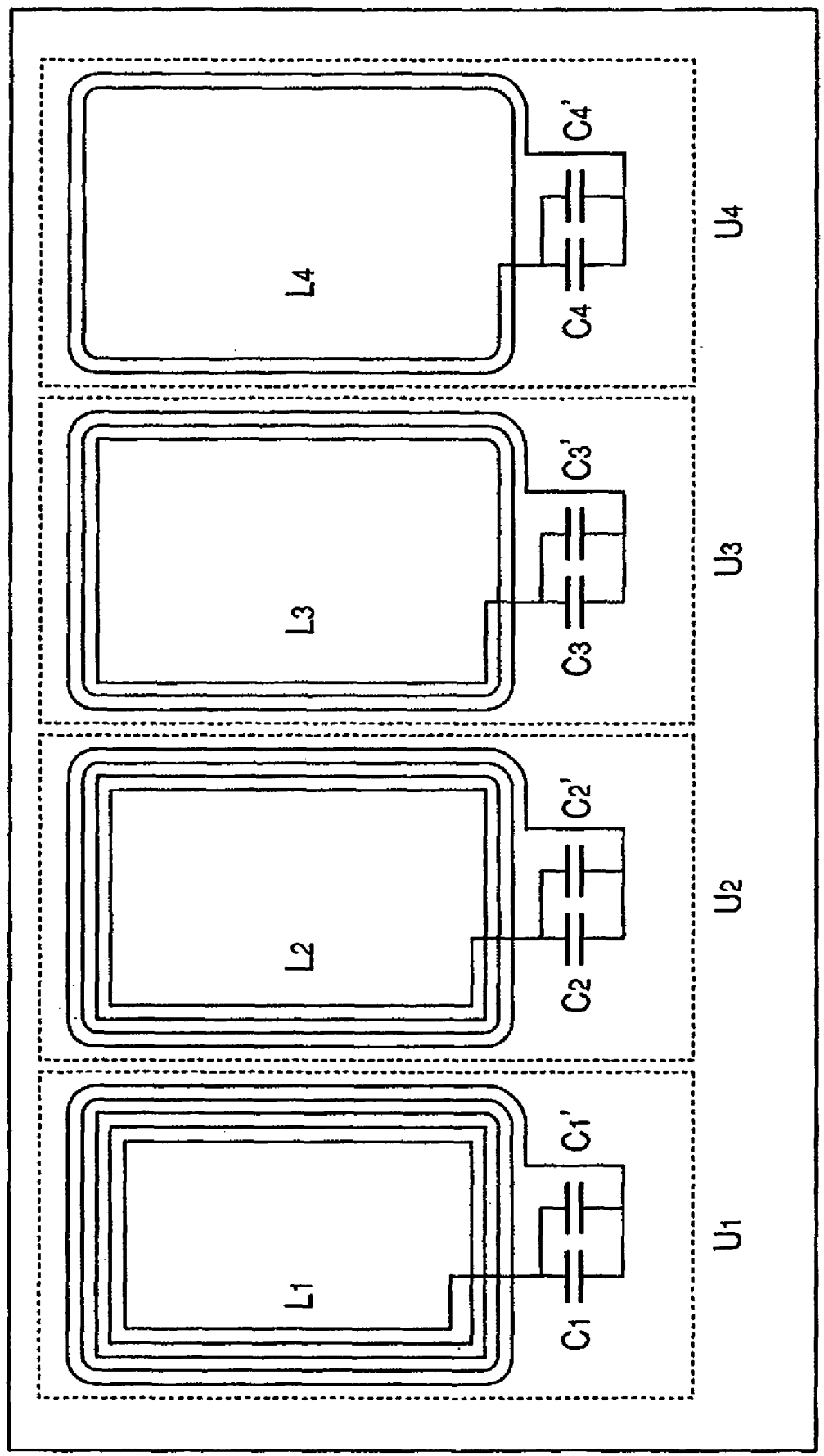
FIG. 8 is a view showing a structure of an RF tag in Embodiment 2 of the present invention.

An RF tag having four. RF resonance circuits U1 to U4 having different resonance frequencies from one another as is shown in FIG. 8 was prepared by forming four sets of the RF resonance circuits each having two anti-fuses C and C' having different threshold voltages (breakdown voltages) from each other and an antenna coil L in series on the same and one substrate, as is shown in FIGS. 7A to 7C. In the above step, the four RF resonance circuits U1 to U4 were formed so that be a resonance frequency can be changed stepwise, by differentiating the turning numbers of the antenna coils to differentiate resonance bands of the antenna coils and by changing the thicknesses of the insulating films to differentiate threshold voltages (breakdown voltages) of two anti-fuses.

Each RF resonance circuit was prepared by the steps of: at first forming a coil antenna 11, a contact pad 10 and a bottom electrode (common electrode) 12 of an anti-fuse on a substrate 9 made of a polyimide resin, by processing a copper foil; further forming alumina films thereon into the thicknesses of 10 nm and 7 nm as insulating films of two anti-fuses 13 and 13', respectively, by a sputtering technique; then forming element-separating films 14a and 14b made of an epoxy resin thereon by a screen printing method; and furthermore, forming upper electrodes 15 and 15' of the anti-fuse and connecting wires 16a and 16b with an electroconductive paste by the screen printing method. Thus, the RF resonance circuit was completed.

When the RF tag has the capacitors C and C' connected in parallel and having different threshold voltages from each other, as in the present embodiment, it can vary a resonance frequency, because the capacitor having the lower threshold voltage of the anti-fuse is selectively short-circuited if it is formed as an anti-fuse.

The RF tag prepared in the present embodiment has a severer operating condition than that in Embodiment 1, because when one anti-fuse is broken-down, the one anti-fuse is changed to a low resistance state but needs to keep an adequate residual resistance so as to apply sufficient bias to the other anti-fuse.

This application claims priority from Japanese Patent Application No. 2004-345837 filed Nov. 30, 2004, which is hereby incorporated by reference herein.

What is claimed is:

1. A radio frequency tag comprising:
a plurality of RF resonance circuits provided on a surface of a substrate, the plurality of RF resonance circuits having resonance frequencies different from each other, each of the plurality of RF resonance circuits comprising:
a coil;
a first capacitor;
a first connecting wire, wherein the coil is connected to the first capacitor by the first connecting wire;
a second capacitor; and
a second connecting wire, wherein the first capacitor is connected to the second capacitor by the second connecting wire,
wherein the first capacitor and the second capacitor are each independently short-circuited,
wherein each of the plurality of RF resonance circuits has three values of resonance frequencies, and of the plurality of RF resonance circuits, the three values of resonance frequencies of each of at least a first RF resonance circuit and a second RF resonance circuit are different from each other,
wherein the coil, a lower electrode of the first capacitor, and a lower electrode of the second capacitor of the first RF resonance circuit, and the coil, a lower electrode of the first capacitor, and a lower electrode of the second capacitor of the second RF resonance circuit, respectively comprise a same material,
wherein an upper electrode of the first capacitor, an upper electrode of the second capacitor, the first connecting wire, and the second connecting wire of the first RF resonance circuit, and an upper electrode of the first capacitor, an upper electrode of the second capacitor, the first connecting wire, and the second connecting wire of the second RF resonance circuit, respectively comprise a same material,
wherein the coil, the lower electrode and the upper electrode of the first capacitor, and the lower electrode and the upper electrode of the second capacitor, of the first RF resonance circuit, are disposed on a same surface of the substrate,
wherein the coil, the lower electrode and the upper electrode of the first capacitor, and the lower electrode and the upper electrode of the second capacitor, of the second RF resonance circuit, are disposed on the same surface of the substrate, wherein the first capacitor and the second capacitor of the first RF resonance circuit are disposed in an in-plane direction of the same surface of the substrate, and are disposed outside of a ring of the coil of the first RF resonance circuit, and the upper electrode of the first capacitor and the upper electrode of the second capacitor are disposed in the in-plane direction of the same surface of the substrate, and wherein the first capacitor and the second capacitor of the second RF resonance circuit are disposed in an in-plane direction of the same surface of the substrate, and are disposed outside of a ring of the coil of the second RF resonance circuit, and the upper electrode of the first capacitor and the upper electrode of the second capacitor are disposed in the in-plane direction of the same surface of the substrate.

2. The radio frequency tag according to claim 1, wherein the coil of the first RF resonance circuit and the coil of the second RF resonance circuit have different numbers of turns.

3. A radio frequency tag comprising:

a substrate;

an RF resonance circuit disposed on one surface side of the substrate, the RF resonance circuit comprising a coil, a first capacitor, and a second capacitor, the first capacitor and the second capacitor being disposed outside of a ring of the coil, wherein the coil, the first capacitor, and the second capacitor are all disposed on the one surface side of the substrate, whereby an upper electrode and a lower electrode of the first capacitor and an upper electrode and a lower electrode of the second capacitor are all disposed on the one surface side of the substrate, wherein the first capacitor and the second capacitor are disposed in an in-plane direction of the one surface side of the substrate, and the upper electrode of the first capacitor and the upper electrode of the second capacitor are disposed in the in-plane direction of the one surface side of the substrate, wherein an inner end portion of the coil and the lower electrode of the first capacitor are connected by a first connecting wire, wherein an outer end portion of the coil and the lower electrode of the second capacitor are connected by a second connecting wire, wherein the upper electrode of the first capacitor and the upper electrode of the second capacitor are connected by a third connecting wire, and wherein the upper electrode of the first capacitor, the upper electrode of the second capacitor, the first connecting wire, and the third connecting wire, respectively comprise a same material.

* * * * *